United States Patent [19]

Buchmeier

[11] 4,151,759
[45] May 1, 1979

[54] INDEXING TABLE, IN PARTICULAR A TURRET HEAD, FOR MACHINE TOOLS

[76] Inventor: Heinz Buchmeier, Halstenbeker Weg 46a, D-2000 Hamburg, Fed. Rep. of Germany

[21] Appl. No.: 808,960

[22] Filed: Jun. 22, 1977

[30] Foreign Application Priority Data

Jun. 22, 1976 [DE] Fed. Rep. of Germany ....... 2627780

[51] Int. Cl.² .................................... B23B 29/32
[52] U.S. Cl. .................................. 74/816; 74/826
[58] Field of Search ............... 74/816, 817, 820, 822, 74/823, 824, 826

[56] References Cited

U.S. PATENT DOCUMENTS

| | | | |
|---|---|---|---|
| 3,222,955 | 12/1965 | Ross et al. | 74/816 X |
| 3,651,698 | 3/1972 | Riedrich et al. | 74/824 X |
| 3,760,655 | 9/1973 | Buchmeier | 74/826 |
| 4,038,891 | 8/1977 | Zaninelli | 74/826 X |

Primary Examiner—Ernest R. Purser
Attorney, Agent, or Firm—Robert E. Burns; Emmanuel J. Lobato; Bruce L. Adams

[57] ABSTRACT

An indexing table for machine tools having a stationary table portion and a movable table portion arranged for rotatable movement relative to the stationary table portion. Coupling elements are disposed between the stationary and movable table portions for controlling rotational movement therebetween and thus movement between the respective indexing positions of the table.

6 Claims, 9 Drawing Figures

INDEXING TABLE, IN PARTICULAR A TURRET HEAD, FOR MACHINE TOOLS

The present invention relates to a remotely controllable indexing table, in particular a turret heat, for machine tools.

Such indexing tables are described in GB-PS 1370129. In such indexing tables the undesirable rotation of the rotatable table portion under the effect of large external forces shortly prior to re-engaging the clutch can be avoided only by additional detent devices. The indexing table requires a large number of individual elements some of which are difficult to produce.

It is an object of the invention to permit indexing tables or turret heads of the kind referred to above to be produced in a simple and economical manner.

It is provided according to the invention that the rotatable table portion is removable from the clutch by means of springs and the drag ring and the driving member which is mounted concentrically about it comprises at its front end a number of coupling teeth which, during the dis-engagement process of the rotatable table portion from the stationary table portion, engage into the counter tooth gaps of a coupling ring which is rigidly connected to the rotatable table portion, and that the coupling teeth of the drag ring are provided on one side with an inclined face which act onto corresponding inclined counter-faces of a base ring in such a manner that when the drag ring is locked in the drag direction and the driving member continues to rotate in the drag direction, the coupling ring yields axially and that thereby the rotatable table portion is locked to the stationary table portion.

German Auslegeschrift No. 1 293 526 discloses a turret head for machine tools, in which the axial displacement of the rotatable table portion is effected against the face cam of an axially secured driving member by co-axially disposed presser springs which are supported by balls on the stationary table portion. The face cam has multiple teeth. It has an inclined face by means of which, upon corresponding rotation of the driving member, the rotatable table portion is couplingly engaged in the dog teeth of the stationary table portion, or however is released upwardly upon opposite rotation of the driving member. Upon rotation of the rotatable table portion the balls subjected to spring pressure slide into recesses of the stationary table portion and thus operate as non-locking pre-detents.

The turret heads or indexing tables constructed according to this principle are operationally reliable only at low loads. At high loads or one-sided loading, in particular when the indexing axis is disposed horizontal, the necessary holding power cannot be provided even with strong holding springs, and the rotatable table portions of the turret heads mis-index against the rotary force of the driving motor. The inclined faces of the frontal cam of the driving member operate in this case like a free-wheeling device, in that the loaded rotatable table portion can run away from the drive.

The present invention obviates this disadvantage, because in all indexing states always at least one of the positively engaging coupling elements between the stationary table portion and the rotatable table portion, or the rotatable table portion and the driving member, respectively, is in engagement. At the same time absolute indexing reliability is ensured even at high loads by three ring members. Owing to its simplicity it leads to a high degree of economy.

The invention will now be described by way of example with reference to the accompanying drawings wherein.

Figure 3:
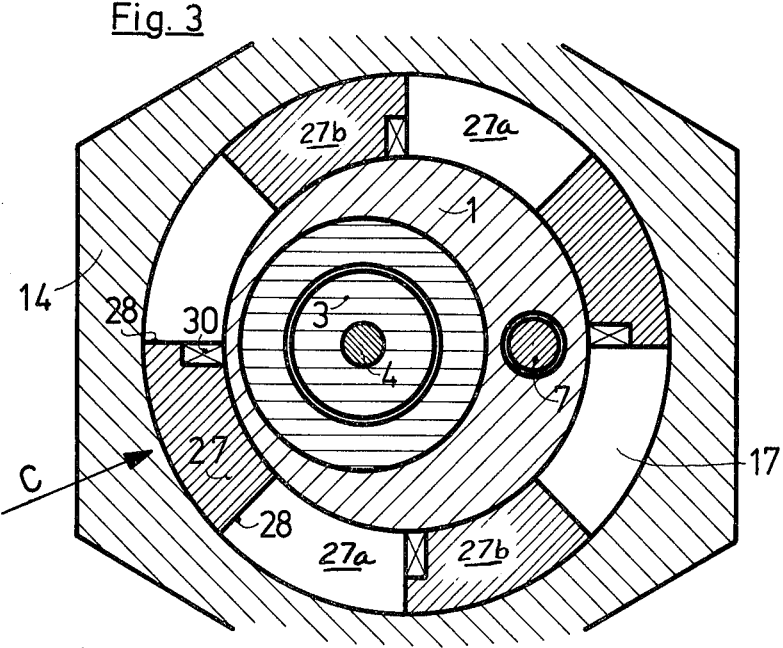
FIG. 3 shows a cross-section on the line B—B of FIG. 1.
Figures 4, 5:
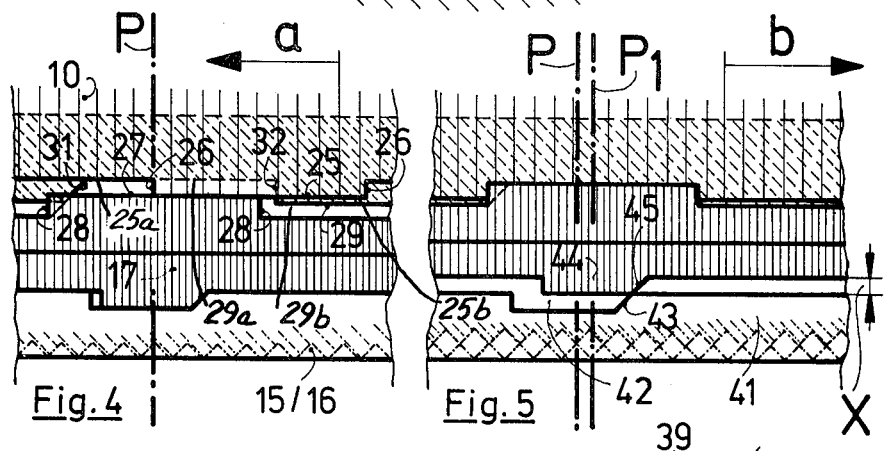
FIG. 4 is a partial development viewed in the direction "C" of FIG. 3.
Figures 6, 7:
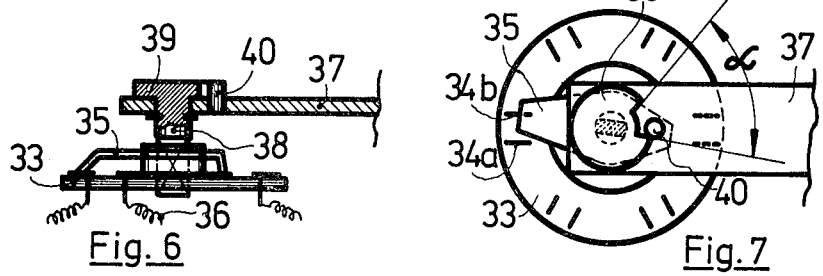
Figures 4A, 5A:
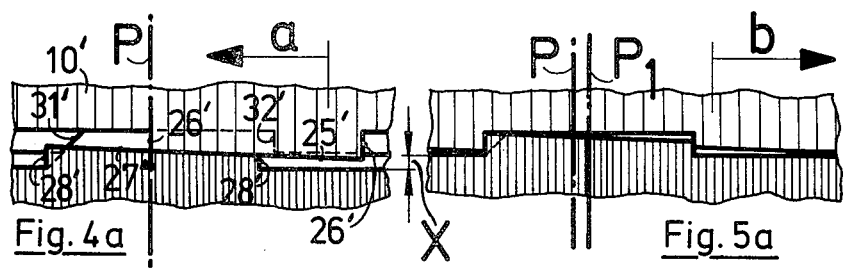

FIG. 4a is a view corresponding to a portion of FIG. 4 but showing a modification, FIG. 5 is a partial development viewed in the direction "C" of FIG. 3 of the same combination as FIG. 4, but in a state "drive engaged readiness for further rotation", FIG. 5a is a view corresponding to a portion of FIG. 5 but showing a modification, FIG. 6 is an axial section through a signal transmitting device; and FIG. 7 is a plan view of the signal transmitting device of FIG. 6.

The indexing table shown in the drawings consists of a stationary table portion and a rotatable table portion 14. The stationary table portion has a base plate 2 and a hollow column 1. A motor 3, preferably a three-phase motor, is mounted within the column 1. The motor 3 alternatively may be actuated by pressure oil or compressed air. A motor shaft 4 drives a driving member 10 by way of gear wheels 5 and 6, a pinion shaft 7 with a pinion 8, and internal teeth 9. The driving member 10 is rotatably mounted via a journal 13 of the hollow column 1, but is axially secured thereon by an abutment disc 11 and screw-threaded nuts 12.

A rotatable table portion 14 is rotatable about the hollow column 1 in an axially displaceable manner and in the locked state has dog teeth 15 thereof rigidly engaged in dog teeth 16 of the base plate 2. The clamping pressure of the rotatable table portion 14 in the dog teeth 15, 16 is transmitted, by way of a coupling ring 17 which is securely screwed to the rotatable table portion 14, to the driving member 10 which is retained upwardly by the screw-threaded nuts 12.

The base plate 2 accommodates presser springs 18 the pressure of which is transmitted to the axial bearing 19 such that upon release of the rotatable table portion 14 they remove the table portion 14 upwardly out of the dog teeth 15,16 together with its maximum load suspended therefrom.

A so-called drag ring 20 is mounted around the hollow column 1 within the driving member 10 and is limited axially upwardly against its abutment face 21, but which can rotate relatively thereto within the driving member 10. The drag ring 20 has internal detents 22 the number of which agree with the number of desired positions of the rotatable table portion 14. The detents 22 are engaged by a locking bolt 23 which is so subjected to tension by a locking bolt spring 24, that the drag ring 20 is rotatable in one rotary direction, and locked in the other rotary direction.

The driving member 10 comprises at its lower end face 25 a plurality of tooth gaps 25a the side walls 26 of which are at right angles to the end face 25, or have an inclination of approximately 2 to 3 degrees to the normal, as is normal in dog clutches. The number of tooth gaps 25a need not agree with the number of positions of the rotatable table portion. The coupling ring 17 comprises at its upper end face 27 the same number of tooth gaps 27a as the driving member 10. The side walls 28 thereof are also rectangular, or have a slight inclination of approximately 2 to 3 degrees, as in the driving 3 10.

Furthermore the respective side walls 28 of the tooth gaps of the coupling ring 17 which face the drawing-in direction "a" are provided with an inclination 30 in the region of the lower end face 29 of the drag ring 20. The drag ring 20 has machined in its lower end face 29, the same number of tooth gaps 29a as the driving member 10 and the coupling ring 17. Whereas the walls of these tooth gaps 29a which face the reverse direction "b" have the same inclinations 31 as the drag ring 20, the oppositely disposed walls of these tooth gaps 32 are rectangular or have a slight inclination. The teeth are formed between the tooth gaps, namely the teeth 25b at the driving member, the teeth 29b at the drag ring and the teeth 27b at the coupling ring 17.

The electrical signal transmitting device for indicating the individual positions of the rotatable table portion 14 is mounted on the journal 13 of the hollow column 1. It consists substantially of a contact disc 33 which is screwed to the journal 13 and which comprises two contacts 34a and 34b for each individual position of the table portion 14. A slider 35 provides the connection to a central contact 36. A driving loop is screwed to the driving member 10 and centrally of the assembly receives a switching pin 38 a collar 39 of which has an angular recess α into which projects a driver pin 40 secured to the driving loop 37. The switching pin 38 is mounted in the driving loop 37, and easily displaceable in respect of the collar 39, so that displacement of the slider 35 by the switching pin 38 does not occur until the driver pin 40 comes into abutment with the side edges of the angular recess α.

Electrical leads (not illustrated) for the driving motor and for the signal transmitting device are led out of the assembly through the hollow column 1 and the base plate 2 to the electrical control device of the machine tool.

Figure 1:
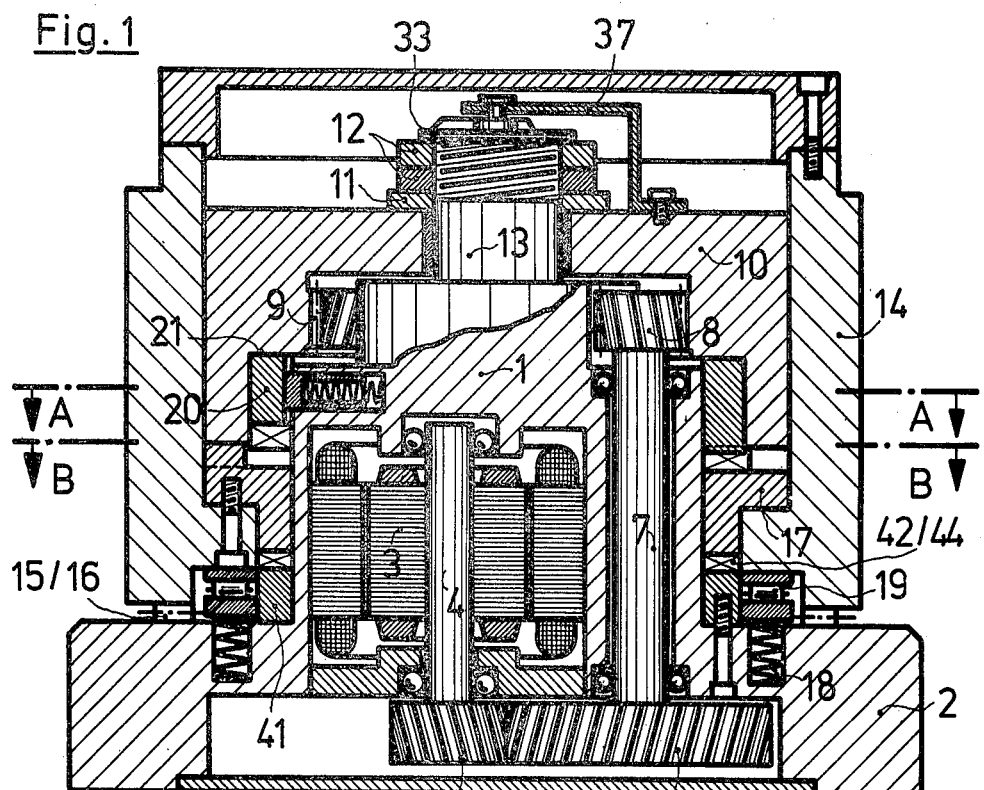
FIG. 1 shows an axial section through an indexing table or head; band.
Figure 2:
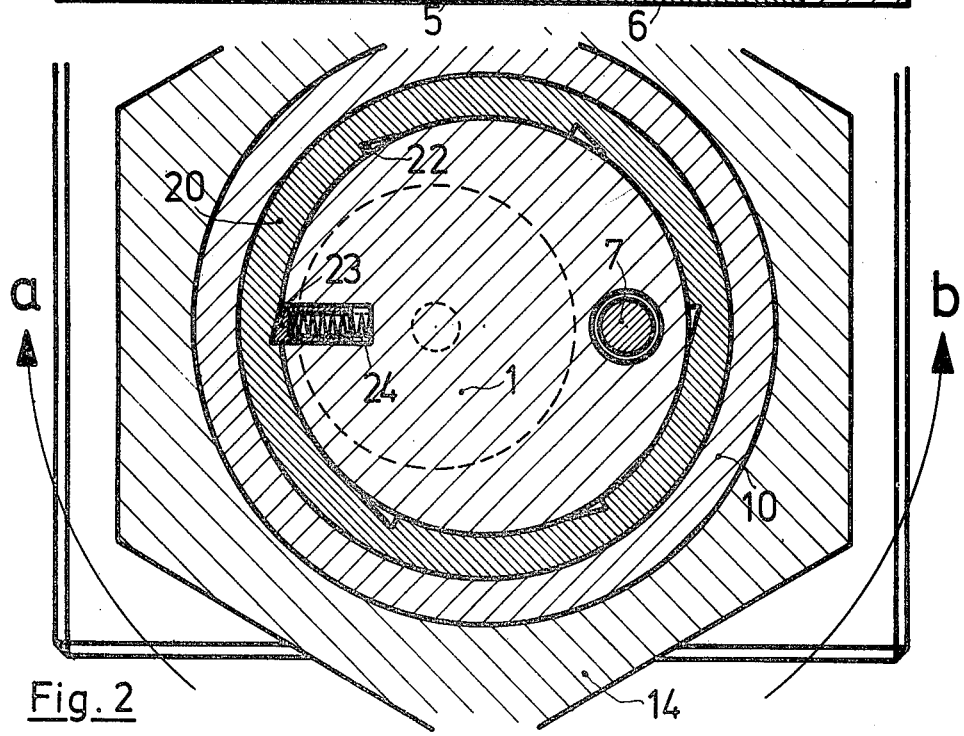
FIG. 2 shows a cross-section on the line A—A of FIG. 1.

When the rotatable table portion 14 locked in the dog teeth 15, 16 is to be displaced into a new position, the driving motor 3 receives voltage from the electric circuit of the machine tool and drives the driving member 10 by way of the reduction gear in the rotary direction which corresponds to the arrow direction "b" in FIG. 2. The lower end face 25 of the driving member 10 slides on the upper end face 27 of the coupling ring 17 under the tension of the tension pressure adjusted by the screw-threaded nuts 12, until a tooth 27b of the coupling ring 17 is located below a tooth gap 25a of the driving member 10. The position "P" of FIG. 4 has thus been reached. During further rotation from "P" to "P1" of FIG. 5 the rotatable table portion, portion 14 which is subjected to the tension of the compression springs 18 slides by its coupling ring 17 over the inclined faces 30 of the coupling ring 17 and over the inclined faces 31 having the same angle of inclination of the drag ring 20 which does not yet rotate, in an axially upward direction, and the teeth 27b of the coupling ring 17 enter positively into the tooth gaps 25a of the driving member 10 in such a manner that a release of this positive connection by external forces is impossible owing to the approximately rectangular configuration of the side walls 26 of the driving member 10 and the sides 28 of the coupling ring 27. In the position "P1" the axial movement of the rotatable table portion 14 is terminated and the two dog teeth 15 and 16 disengaged. The flank angle of the two dog teeth must correspond to the inclination angle of the inclined faces 30 and 31. The rotatable table portion 14 is then rotated further by the driving motor 3 into the desired position, the rotation occurring beyond the position by the angular measure path "P - P1". At this location the slider 35 has reached the contact 34a and the driving motor receives the signal "reverse". At the same instant of time the locking bolt 23 has dropped into one of the detents 22 of the drag ring 20, under the tension of the locking bolt spring 24, the ring now being locked in the rotary direction "a", whereas previously, during the rotation in the arrow direction "b", it had been driven by the driving member 10 by the side walls 26 and 32.

The side walls 26 of the driving member 10 which face the direction "a", then rotate the coupling ring 17 and thus the rotatable table portion 14 in the rotary direction "a" and the coupling ring 17 and the rotatable table portion 14 slide downwardly at the inclined faces 31 of the stationary drag ring 20 and the two dog teeth 15 and 16 close positively. The driving motor continues to rotate the driving member in the rotary direction "a" and the front teeth 25b and 27b of the driving member 10 and the coupling ring 17 slide on each other under the tension of the screw-threaded nuts 12 until the motor is switched off when the front teeth 25b and 27b overlap about half-way.

Switching-off is effected by the signal delivery of the contact 34b when abutted by the slider 35 and which in turn is driven in the rotary direction "a" by the contact loop 37 and the switching pin 38 by way of the driver pin 40. The angular recess α is so dimensioned that the contact engagement with the contact 34b occurs when the approximately half overlap of the front teeth of coupling ring 17 and driving member 10 is attained. The contact 34b delivers at the same time the signal delivery for the running of the machine tool to continue.

In heavy indexing tables or turret heads with high loading the effect of the compression springs 18 may be assisted by a detent ring 41 which is arranged stationary and the recesses 42 of which with inclination 43 are engaged by lower teeth 44 with inclinations 45 of the coupling ring 17 which effect an enforced lift-out "XX38 of the rotatable table portion 14 in co-operation with the compression springs 18 upon rotation in the direction "b".

The end faces 25 of the driving member and the counter end faces 27 of the coupling ring 17 may be provided with a slight inclination relatively to the travelling plane in the rotary locking direction. This is illustrated in FIGS. 4a and 5a of the drawing in which corresponding parts are designated by the same reference numerals with the addition of a prime. In this case the angle of rise should correspond to that of a self-locking screwthread.

I claim:

1. An indexing table for machine tools comprising a stationary table portion for attachment to a machine tool, a movable table portion rotatably mounted about said stationary table portion and axially displaceable relative thereto, clutch means for coupling the movable table portion to the stationary table portion, a drive member disposed between the stationary and movable table portions, means for rotating the movable table portion via the drive member in a first rotary indexing direction relative to said stationary table portion in a disengaged position of the clutch means and in the opposite rotary direction to engage the stationary table portion after attaining a desired operational position of the movable table portion, a drag ring mounted for rotation around the stationary table portion and together with said movable table portion in the first rotary indexing direction thereof, means for preventing rotation of the drag ring in the opposite rotary direction when a predetermined excess angle is travelled through beyond said operational position, spring means acting between said stationary table portion and movable table portion to bias said movable table portion into said disengaged position of the clutch means, a coupling ring connected to said movable table portion and having teeth with intervening tooth gaps, said drag ring and driving member being providing with a plurality of coupling teeth for engaging corresponding tooth gaps of said coupling ring connected to the movable table portion, the coupling teeth of the drag ring being provided with inclined faces which cooperate with corresponding inclined counter faces of the coupling ring in such a manner that the coupling ring yields axially when the drag ring is locked during movement in said opposite rotary direction and the drive member continues to rotate in said opposite rotary direction to thereby engage the movable table portion with the stationary table portion.

2. An indexing table according to claim 1, wherein said coupling teeth have side walls constructed at right angles relative to the respective opposing faces of the coupling ring and driving member or have an inclination of a few angular degrees relative to the normal.

3. An indexing table according to claim 2, wherein said clutch means has dog teeth which agree with the angles of inclination of the inclined faces of the drag ring and the coupling ring.

4. An indexing table according to claim 3, wherein the angles of inclination are 45 degrees.

5. An indexing table according to claim 4, wherein the lower end faces of the driving member and the counter end faces of the coupling ring are constructed with a rising inclination in said second opposite rotary direction, the inclination corresponding to the slope angle of a self-locking screwthread.

6. An indexing table according to claim 1, wherein the inclined counter faces on the coupling ring extend only over the region corresponding to the drag ring.

* * * * *